United States Patent
Semenov et al.

(10) Patent No.: US 12,190,622 B2
(45) Date of Patent: Jan. 7, 2025

(54) DOCUMENT CLUSTERIZATION

(71) Applicant: ABBYY Development Inc., Dover, DE (US)

(72) Inventors: Stanislav Semenov, Moscow (RU); Alexandra Antonova, Moscow (RU); Aleksey Misyurev, Moscow (RU)

(73) Assignee: ABBYY Development Inc., Dover, DE (US)

(*) Notice: Subject to any disclaimer, the term of this patent is extended or adjusted under 35 U.S.C. 154(b) by 475 days.

(21) Appl. No.: 16/951,485

(22) Filed: Nov. 18, 2020

(65) Prior Publication Data
US 2022/0156491 A1    May 19, 2022

(30) Foreign Application Priority Data
Nov. 13, 2020   (RU) .......................... RU2020137345

(51) Int. Cl.
*G06V 30/418*  (2022.01)
*G06F 16/35*   (2019.01)
*G06N 3/04*    (2023.01)

(52) U.S. Cl.
CPC .......... *G06V 30/418* (2022.01); *G06F 16/353* (2019.01); *G06F 16/355* (2019.01); *G06N 3/04* (2013.01)

(58) Field of Classification Search
CPC ... G06V 30/418; G06F 16/353; G06F 16/355; G06F 18/23; G06N 3/04; G06N 3/044;
(Continued)

(56) References Cited

U.S. PATENT DOCUMENTS 5,638,491 A    6/1997  Moed
6,886,136 B1   4/2005  Zlotnick
(Continued)

FOREIGN PATENT DOCUMENTS

CN    106649853 A    5/2017
CN    106654853 A    5/2017
(Continued)

OTHER PUBLICATIONS

Maher, Komal, and Madhuri S. Joshi. "Effectiveness of different similarity measures for text classification and clustering." International Journal of Computer Science and Information Technologies 7.4 (2016): 1715-1720. (Year: 2016).*
(Continued)

*Primary Examiner* — Amandeep Saini
*Assistant Examiner* — Denise G Alfonso
(74) *Attorney, Agent, or Firm* — Lowenstein Sandler LLP (57) ABSTRACT

A computer-implemented method for document clusterization, comprising: receiving an input document; determining, by evaluating a document similarity function, a plurality of similarity measures, wherein each similarity measure of the plurality of similarity measures reflects a degree of similarity between the input document and a corresponding cluster of documents of a plurality of clusters of documents; based on the plurality of similarity measures, determining that the input document does not belong to any of the clusters of documents of the plurality of clusters of documents; creating a new cluster of documents; and associating the input document with the new cluster of documents.

20 Claims, 6 Drawing Sheets

(58) Field of Classification Search
CPC ........ G06N 3/045; G06N 20/10; G06N 3/084; G06N 3/088

See application file for complete search history.

(56) References Cited

U.S. PATENT DOCUMENTS

| | | | |
|---|---|---|---|
| 7,370,034 B2 | 5/2008 | Franciosa et al. | |
| 8,265,925 B2 | 9/2012 | Aarskog | |
| 8,595,235 B1 | 11/2013 | Sampson | |
| 8,726,148 B1 | 5/2014 | Battilana | |
| 8,923,618 B2 | 12/2014 | Kutsumi | |
| 9,613,299 B2 | 4/2017 | Krivosheev et al. | |
| 10,013,643 B2 | 7/2018 | Yellapragada et al. | |
| 10,360,507 B2 | 7/2019 | Aravamudan | |
| 10,467,464 B2 | 11/2019 | Pranatharthiharan et al. | |
| 10,558,712 B2 | 2/2020 | Zholudev | |
| 10,679,085 B2 | 6/2020 | Li | |
| 10,872,236 B1 | 12/2020 | Elor | |
| 11,074,442 B2 | 7/2021 | Semenov | |
| 2006/0242610 A1 | 10/2006 | Aggarwal | |
| 2007/0244915 A1 | 10/2007 | Cha | |
| 2008/0077572 A1 | 3/2008 | Boyle et al. | |
| 2009/0210406 A1* | 8/2009 | Freire | G06F 16/35 707/999.005 |
| 2011/0093464 A1* | 4/2011 | Cvet | G06F 16/355 707/E17.089 |
| 2013/0262465 A1* | 10/2013 | Galle | G06F 16/00 707/E17.089 |
| 2015/0112874 A1* | 4/2015 | Serio | G06Q 30/0278 705/306 |
| 2016/0004667 A1 | 1/2016 | Chakerian et al. | |
| 2016/0148074 A1 | 5/2016 | Jean et al. | |
| 2016/0171627 A1 | 6/2016 | Lyubarskiy | |
| 2017/0061250 A1 | 3/2017 | Gao et al. | |
| 2017/0351781 A1 | 12/2017 | Alexander et al. | |
| 2018/0181808 A1 | 6/2018 | Sridharan | |
| 2018/0285448 A1 | 10/2018 | Chia | |
| 2018/0349743 A1 | 12/2018 | Iurii | |
| 2019/0019503 A1 | 1/2019 | Henry | |
| 2019/0180094 A1 | 6/2019 | Zagaynov et al. | |
| 2019/0180154 A1 | 6/2019 | Orlov et al. | |
| 2019/0205451 A1 | 7/2019 | Alipov et al. | |
| 2019/0266394 A1 | 8/2019 | Yu et al. | |
| 2019/0294874 A1 | 9/2019 | Orlov et al. | |
| 2019/0294921 A1 | 9/2019 | Kalenkov | |
| 2019/0311194 A1 | 10/2019 | Zhuravlev | |
| 2019/0361972 A1 | 11/2019 | Lin | |
| 2019/0385001 A1 | 12/2019 | Stark | |
| 2020/0327351 A1 | 10/2020 | Abedini et al. | |
| 2020/0327360 A1 | 10/2020 | Samala | |
| 2020/0364451 A1 | 11/2020 | Ammar | |
| 2021/0012102 A1 | 1/2021 | Cristescu et al. | |
| 2021/0019512 A1 | 1/2021 | Uppal et al. | |
| 2021/0034853 A1 | 2/2021 | Matsumoto | |
| 2021/0064861 A1 | 3/2021 | Semenov | |
| 2021/0064908 A1 | 3/2021 | Semenov | |
| 2021/0124919 A1 | 4/2021 | Balakrishnan et al. | |
| 2021/0149993 A1 | 5/2021 | Torres | |
| 2021/0150338 A1 | 5/2021 | Semenov | |
| 2021/0165964 A1 | 6/2021 | Jones | |
| 2021/0182328 A1* | 6/2021 | Rollings | G06F 16/355 |
| 2021/0201013 A1 | 7/2021 | Makhija | |
| 2021/0271872 A1 | 9/2021 | Gupta | |
| 2021/0295103 A1* | 9/2021 | Tanniru | G06V 10/7747 |

FOREIGN PATENT DOCUMENTS

| | | |
|---|---|---|
| CN | 107168955 A | 9/2017 |
| CN | 107168955 B | 6/2019 |
| EP | 3437019 B1 | 9/2020 |
| RU | 2556425 C1 | 7/2015 |
| RU | 2661750 C1 | 7/2018 |
| RU | 2668717 C1 | 10/2018 |
| RU | 2679209 C2 | 2/2019 |
| RU | 2691214 C1 | 6/2019 |
| RU | 2693332 C1 | 7/2019 |
| RU | 2693916 C1 | 7/2019 |
| RU | 2737720 C1 | 12/2020 |
| WO | 2013135474 A1 | 9/2013 |
| WO | 2018126325 A1 | 7/2018 |

OTHER PUBLICATIONS

Rashad, Mohamed Ahmed, Hesham El-Deeb, and Mohamed Waleed Fakhr. "Document classification using enhanced grid based clustering algorithm." New Trends in Networking, Computing, E-learning, Systems Sciences, and Engineering. Springer International Publishing, 2015. (Year: 2015).*

Forsati, Rana, et al. "Efficient stochastic algorithms for document clustering." Information Sciences 220 (2013): 269-291. (Year: 2013).*

Katti, Anoop R, et al., "Applying Sequence-to-Mask Models for Information Extraction from Invoices", 13th 'APR ntemational Workshop on Document Analysis Systems, Short Papers Booklet DAS, Vienna, Austria, Apr. 24-27, 2018, pp. 9-10.

Palm, Rasmus Berg, et al., "CloudScan—A Configuration-Free Invoice Analysis System Using Recurrent Neural etworks", IEEE, 2017 14th IAPR International Conference on Document Analysis and Recognition (ICDAR), Aug. 4, 2017, 8 pages.

Raoui-Outach, Rizlene, et al., Deep Learning for Automatic Sale Receipt Understanding, IEEE, Dec. 5, 2017, 7 pages.

Zuev, Konstantin, et al—U.S. Appl. No. 16/017,683, "Text Field Detection Using Neural networks", filed Jun. 25, 2018.

Mozharova, V., Lukashevich N., "Investigation of features for extraction of named entities from texts in Russian", https://patents.google.com/scholar/16285686872319998042?q=text+field+entry+word+extraction+detection+connection+key+hyphotesys+learning&scholar&oq=text+field+entry+word+extraction+detection+connection+key +hyphotesys+learning, 2017, 2 Pages.

Ma, Edward, "3 subword algorithms help to improve your NLP model performance, Introduction to subword", https://medium.com/@makcedward/how-subword-helps-on-your-nlp-model-83dd1b836f46, May 18, 2019, 7 pages.

Sandhan, et al, Indian Institute of Technology, Kanpur, UP, India, "Revisiting the Role of Feature Engineering for Compound Type Identification in Sanskrit", https://www.aclweb.org/anthology/W19-7503.pdf, 17 pages.

\* cited by examiner

DOCUMENT CLUSTERIZATION

RELATED APPLICATIONS

This application claims priority under 35 USC 119 to Russian patent application No. 2020137345, filed Nov. 13, 2020.

TECHNICAL FIELD

The implementations of the disclosure relate generally to computer systems and, more specifically, to systems and methods for document analysis.

BACKGROUND

One of foundational tasks in processing, storing, and referencing documents is grouping documents in different categories. Conventional approaches for grouping documents may involve the use of a large number of predetermined categories and/or classification rules. Such methods of document grouping require many human operations and lack flexibility.

SUMMARY OF THE DISCLOSURE

Implementations of the present disclosure describe mechanisms for document clusterization, comprising: receiving an input document; determining, by evaluating a document similarity function, a plurality of similarity measures, wherein each similarity measure of the plurality of similarity measures reflects a degree of similarity between the input document and a corresponding cluster of documents of a plurality of clusters of documents; based on the plurality of similarity measures, determining that the input document does not belong to any of the clusters of documents of the plurality of clusters of documents; creating a new cluster of documents; and associating the input document with the new cluster of documents. In some implementations, the similarity function is based on one or more of types calculated attributes of the first document selected from the group consisting of GRID type attribute, SVD type attribute, Image type attribute, wherein using the similarity function comprises using a first neural network, wherein the input document is a text document, wherein the similarity function determines similarity measure of the first document and a first cluster of documents from the plurality of clusters by calculating level of similarity between the first document and a centroid of the first cluster of documents, wherein the similarity function determines similarity measure of the first document and a first cluster of documents from the plurality of clusters by calculating respective levels of similarity between the first document and one or more documents from the first cluster of documents. In some implementations, responsive to determining that a first cluster of documents of the plurality of clusters of documents is associated with a first document having a first value of a document feature and a second cluster of documents of the plurality of clusters of documents is associated with a second document having the first value of the document feature, merging the first cluster of documents and the second cluster of documents.

A non-transitory machine-readable storage medium of the disclosure includes instructions that, when accessed by a processing device, cause the processing device to: receiving an input document; determining, by evaluating a document similarity function, a plurality of similarity measures, wherein each similarity measure of the plurality of similarity measures reflects a degree of similarity between the input document and a corresponding cluster of documents of a plurality of clusters of documents; based on the plurality of similarity measures, determining that the input document does not belong to any of the clusters of documents of the plurality of clusters of documents; creating a new cluster of documents; and associating the input document with the new cluster of documents. In some implementations, the similarity function is based on one or more of types calculated attributes of the first document selected from the group consisting of GRID type attribute, SVD type attribute, Image type attribute, wherein using the similarity function comprises using a first neural network, wherein the input document is a text document, wherein the similarity function determines similarity measure of the first document and a first cluster of documents from the plurality of clusters by calculating level of similarity between the first document and a centroid of the first cluster of documents, wherein the similarity function determines similarity measure of the first document and a first cluster of documents from the plurality of clusters by calculating respective levels of similarity between the first document and one or more documents from the first cluster of documents. In some implementations, responsive to determining that a first cluster of documents of the plurality of clusters of documents is associated with a first document having a first value of a document feature and a second cluster of documents of the plurality of clusters of documents is associated with a second document having the first value of the document feature, merging the first cluster of documents and the second cluster of documents.

A system of the disclosure includes a memory, and a processing device operatively coupled to the memory, the processing device to: receiving an input document; determining, by evaluating a document similarity function, a plurality of similarity measures, wherein each similarity measure of the plurality of similarity measures reflects a degree of similarity between the input document and a corresponding cluster of documents of a plurality of clusters of documents; based on the plurality of similarity measures, determining that the input document does not belong to any of the clusters of documents of the plurality of clusters of documents; creating a new cluster of documents; and associating the input document with the new cluster of documents. In some implementations, the similarity function is based on one or more of types calculated attributes of the first document selected from the group consisting of GRID type attribute, SVD type attribute, Image type attribute, wherein using the similarity function comprises using a first neural network, wherein the input document is a text document, wherein the similarity function determines similarity measure of the first document and a first cluster of documents from the plurality of clusters by calculating level of similarity between the first document and a centroid of the first cluster of documents, wherein the similarity function determines similarity measure of the first document and a first cluster of documents from the plurality of clusters by calculating respective levels of similarity between the first document and one or more documents from the first cluster of documents. In some implementations, responsive to determining that a first cluster of documents of the plurality of clusters of documents is associated with a first document having a first value of a document feature and a second cluster of documents of the plurality of clusters of documents is associated with a second document having the first value of the document feature, merging the first cluster of documents and the second cluster of documents.

Implementations of the present disclosure also describe mechanisms for document clusterization, comprising: receiving an input document; determining, by evaluating a first document similarity function, a first plurality of similarity measures, wherein each similarity measure of the first plurality of similarity measures reflects a degree of similarity between the input document and a corresponding cluster of documents of a plurality of clusters of documents; based on the plurality of similarity measures, determining that the input document belongs to a first cluster of documents of the plurality of clusters of documents, wherein a maximum difference between a centroid of the first cluster of documents and responsive centroids of a subset of the plurality of clusters of documents falls below a predetermined threshold; determining, by evaluating a second document similarity function, a second plurality of similarity measures, wherein each similarity measure of the second plurality of similarity measures reflects a degree of similarity between the input document and a corresponding cluster of documents of the subset of the plurality of clusters of documents; associating the input document with a cluster of documents associated with a maximum similarity measure of the second plurality of similarity measures.

Implementations of the present disclosure also describe mechanisms for document clusterization, comprising: receiving an input document; identifying, by evaluating ranking function for the input document, a first cluster of documents of a plurality of clusters of documents, wherein the input document belongs to the identified cluster of documents, and wherein a maximum difference between a centroid of the first cluster of documents and responsive centroids of a subset of the plurality of clusters of documents falls below a predetermined threshold; determining, by evaluating a document similarity function, a plurality of similarity measures, wherein each similarity measure of the plurality of similarity measures reflects a degree of similarity between the input document and a corresponding cluster of documents of the subset of the plurality of clusters of documents; associating the input document with a cluster of documents associated with a maximum similarity measure of the plurality of similarity measures, responsive to determining that the maximum similarity measure falls below a similarity measure threshold, creating a new cluster of documents; and associating the input document with the new cluster of documents.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Implementations for document clusterization are described. Various methods of grouping a large number of documents involve predefining number of groups and specific parameters for each group. In addition, a set of attributes must be created for each group to identify documents belonging to that group. These are very tedious and time-consuming tasks, requiring detailed knowledge, in advance of grouping, of types of documents to be found in the document repository. Such approach also is not easily adaptable to a different set of documents or change of grouping criteria.

For instance, when using such approach, in order to set up of a grouping process of vendor-related documents, one would be required to create a detailed descriptions of document attributes for each known vendor. Then a classifier needs to be developed to sort the documents based on these attributes. However, if a new vendor is added, a set of attributes, corresponding to the new vendor has to be created manually, and also the document classifier has to be reconfigured to include new category and new sorting criteria.

Aspects of the disclosure address the above noted and other deficiencies by providing mechanisms for document clusterization without prior knowledge of types of documents to be sorted and irrespective of the number of existing groups (clusters) of documents.

As used herein, "electronic document" (also referred to simply as "document" herein) may refer to any document whose image may be accessible to a computing system. The image may be a scanned image, a photographed image, or any other representation of a document that is being capable of being converted into a data form accessible to a computer. For example, "electronic document" may refer to a file comprising one or more digital content items that may be visually rendered to provide a visual representation of the electronic document (e.g., on a display or a printed material). In accordance with various implementations of the present disclosure, a document may conform to any suitable electronic file format, such as PDF, DOC, ODT, JPEG, etc.

"Document" may represent a financial document, a legal document, or any other document, e.g., a document that is produced by populating fields with alphanumeric symbols (e.g., letters, words, numerals) or images. "Document" may represent a document that is printed, typed, or handwritten (for example, by filling out a standard form). "Document" may represent a form document that has a variety of fields, such as text fields (containing numerals, numbers, letters, words, sentences), graphics field (containing a logo or any other image), tables (having rows, columns, cells), and so on.

As used herein, "document cluster" may refer to one or more documents combined in a group based on one or more of document characteristics (attributes). For example, these characteristics may include document type (for example, a picture, a text document, or a table, etc.), document category (for example, agreements, invoices, business cards, or checks), or a vendor referenced by the document.

The techniques described herein allow for automatic clusterization of documents using artificial intelligence. The techniques may involve training a neural network to cluster documents into unspecified classes. The neural network may include multiple neurons that are associated with learnable weights and biases. The neurons may be arranged in layers. The neural network may be trained on a training dataset of documents that contain known documents. For example, the training data set may include examples of documents belonging to predetermined classes as training inputs and one or more similarity measures, identifying how similar the document is to a particular class, as training outputs.

The neural network may generate an observed output for each training input. The observed output of the neural network may be compared with a target output corresponding to the training input as specified by the training data set, and the error may be propagated back to the previous layers of the neural network, whose parameters (e.g., the weights and biases of the neurons) may be adjusted accordingly. During training of the neural network, the parameters of the neural network may be adjusted to optimize the prediction accuracy. Once trained, the neural network may be used for automatic document clusterization using similarity measures between a document and known document clusters.

Figure 1:
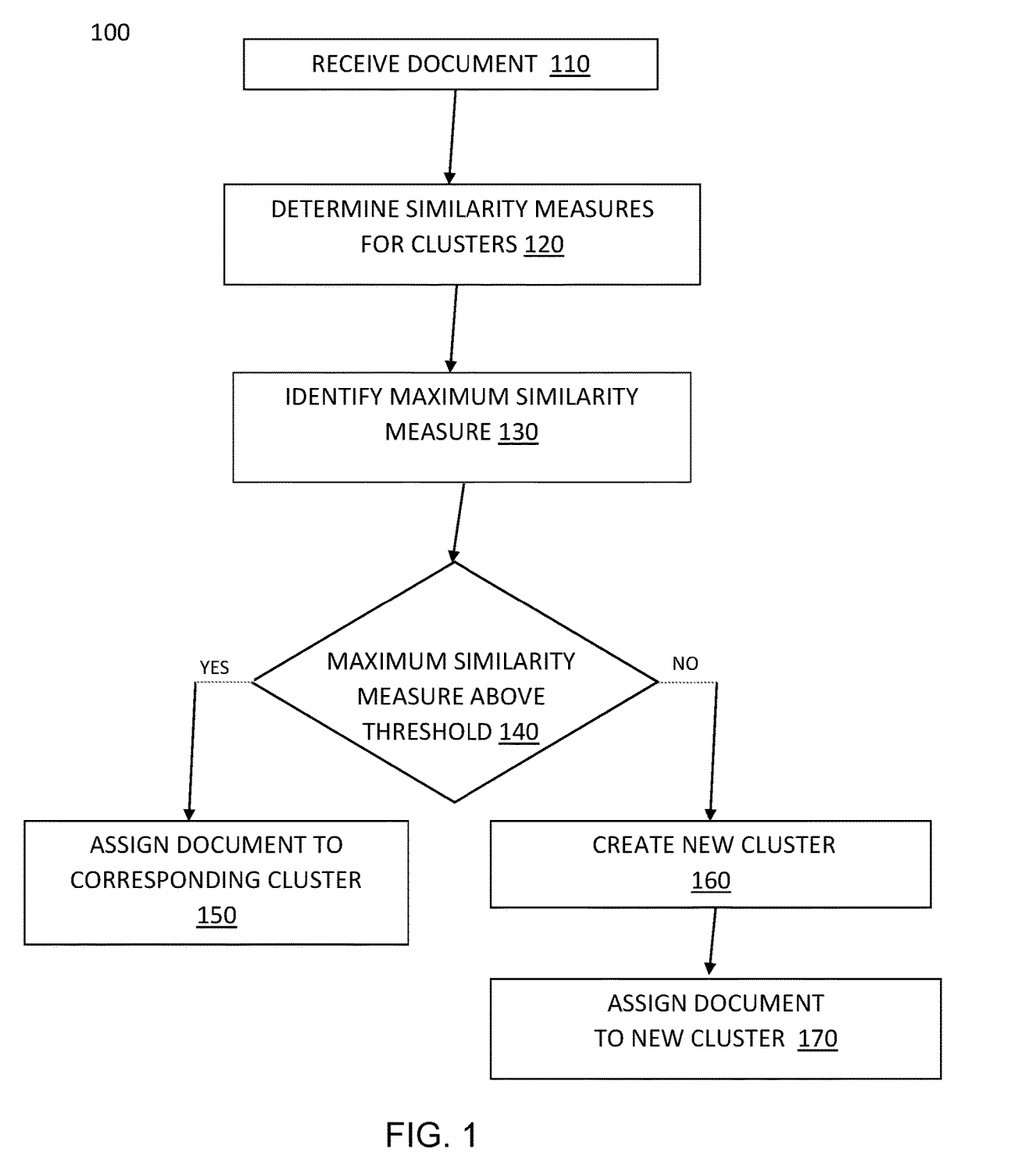
FIG. 1 is a flow diagram illustrating one exemplary method of document clusterization, in accordance with some implementations of the present disclosure.

FIG. 1 is a flow diagram illustrating exemplary method 100 of document clusterization, in accordance with some implementations of the present disclosure. Method 100 may be performed by processing logic that may comprise hardware (e.g., circuitry, dedicated logic, programmable logic, microcode, etc.), software (such as instructions run on a processing device), firmware, or a combination thereof. In one implementation, method 100 may be performed by a processing device (e.g. a processing device 302 of FIG. 3) of a computing device 210 and/or a server machine 250 as described in connection with FIG. 2. In certain implementations, method 100 may be performed by a single processing thread. Alternatively, method 100 may be performed by two or more processing threads, each thread executing one or more individual functions, routines, subroutines, or operations of the method. In an illustrative example, the processing threads implementing method 100 may be synchronized (e.g., using semaphores, critical sections, and/or other thread synchronization mechanisms). Alternatively, the processing threads implementing method 100 may be executed asynchronously with respect to each other. Therefore, while FIG. 1 and the associated descriptions list the operations of method 100 in certain order, various implementations of the methods may perform at least some of the described operations in parallel and/or in arbitrary selected orders.

At block 110, the processing device performing method 100 may receive one or more documents from a document repository.

A document repository may be an electronic storage device that can be used to store data. This includes but is not limited to internal and external hard drives, CDs, DVDs, Floppy Disks, USB drives, ZIP disks, magnetic tapes and SD cards. A repository may contain multiple folders and subfolders. A document may be a text document, a PDF document, a picture document, a photo image, etc.

At block 120, the processing device performing method 100 may determine, for a document 115 from the repository, a similarity measure for each of one or more existing clusters. A similarity measure reflects the degree of similarity between the document 115 and a document cluster (which may include one or more documents). Such a similarity measure may be calculated using a similarity function, which, given two documents as an input, produces a number indicative of degree of similarity between these two documents. In some implementations of the present disclosure, the output of the similarity function is a number between 0 and 1.

In some implementations, the similarity function is an analytical function (i.e., may be expressed by a mathematical formula). In some implementations, the similarity function may be implemented as an algorithm (e.g., described as a sequence of actions). The similarity function may use one or more document attributes to determine degree of similarity between documents.

In some implementations, GRID type document attributes are used to determine degree of similarity. GRID type document attributes are calculated by breaking a document into multiple cells, forming a grid, and calculating image attributes for each cell. In order to compare two documents using GRID type attributes, attributes for a cell of a first document are compared with attributes for a corresponding (i.e., similarly positioned) cell of a second document. Results of cell-by-cell comparisons are used to determine degree of similarity between the entire documents.

In some implementations, SVD type of document attributes are used to determine the degree of similarity. SVD (singular value decomposition) type document attributes are determined using singular value decomposition of word matrix with corresponding word frequency. Any document may be characterized by a set of words present in the document and frequency of their use in the document. A set of mappings can be created, such that each mapping associates a word with the number of occurrences of the word in the document. For example, the set of mapping may be represented by a table that lists words (or their identifiers) in the first column and number of times the word in present in the document in the second column. Such a high-rank matrix may be converted to a lower-rank matrix, that can be used as an SVD type attribute of a document.

In some implementations, image type of document attributes are used to determine degree of similarity between two documents. Image attribute is a set of parameters produced by a convolutional neural network processing a document image. Image attribute is usually a set of numbers that encode the document image.

In some implementations of the present invention, the similarity function uses one or more of the above-listed attributes to determine a similarity measure between two documents. In some implementations, the similarity function uses other types of document attributes, not listed above, sometimes in combinations with the above-identified types of attributes.

In some implementations of the present invention, the similarity function may be realized using gradient boosting.

In some implementations, the similarity function is realized as a neural network.

In some implementations, the similarity function may be constructed in such a way that it may yield false negative results (i.e., when the similarity value yielded by the similarity function for two documents belonging to the same cluster would fall below a predetermined similarity threshold), while but is very unlikely to yield false positive results (i.e., when the similarity value yielded by the similarity function for two documents belonging to different clusters would exceed the predetermined similarity threshold). This can be achieved by utilizing a relatively large number of document attributes and/or training the similarity function on a relatively large number of documents.

Figure 2:
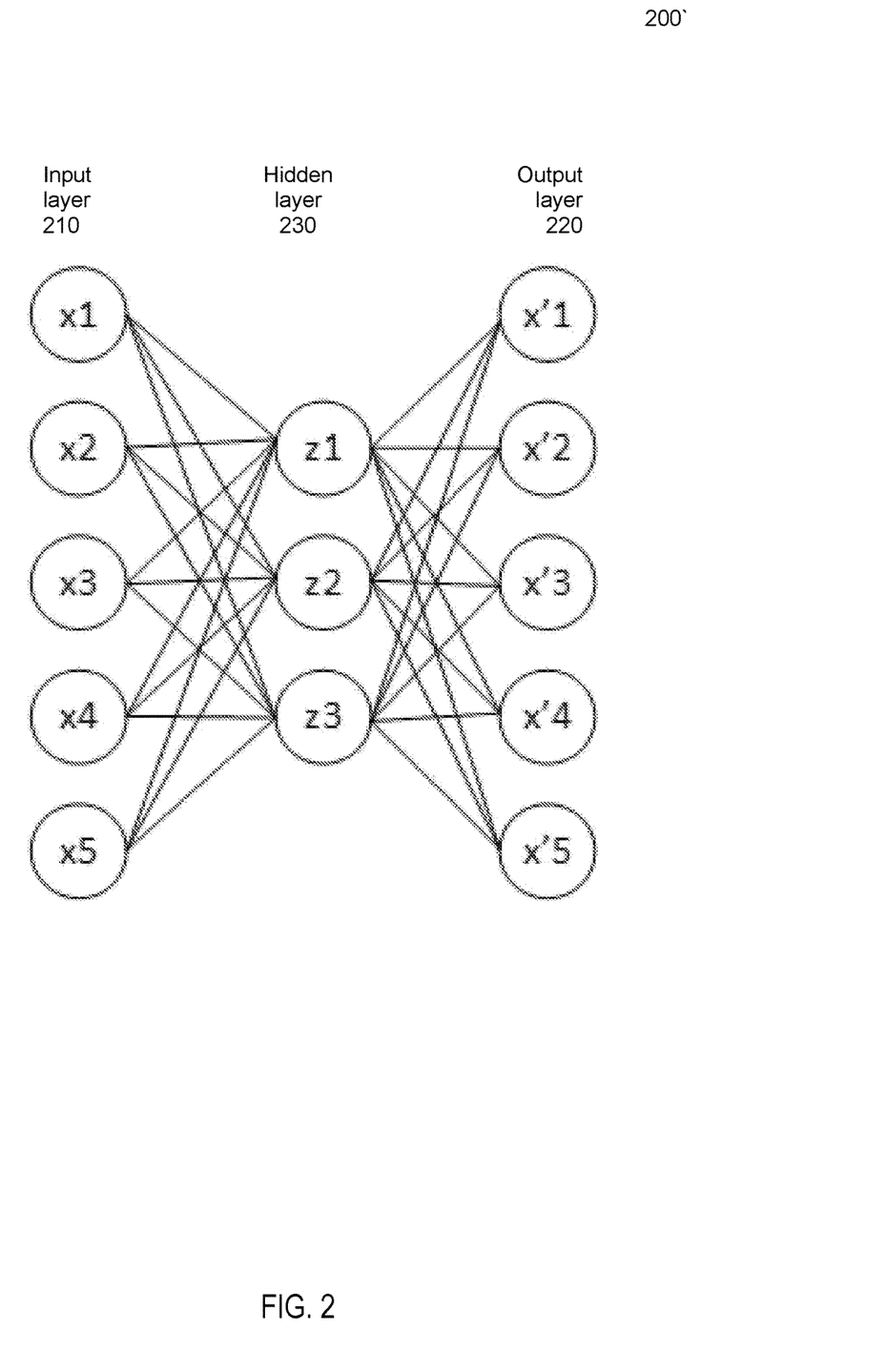
FIG. 2 is a schematic illustration of a structure of a neural network operating in accordance with one or more aspects of the present disclosure

FIG. 2 schematically illustrates a structure of a neural network operating in accordance with one or more aspects of the present disclosure. As shown in FIG. 2, the neural network 200 may be represented by a feed-forward, non-recurrent neural network including an input layer 210, an output layer 220 and one or more hidden layers 230 connecting the input layer 210 and the output layer 220. The output layer 220 may have the same number of nodes as the input layer 210, such that the network 200 may be trained, by an unsupervised learning process, to reconstruct its own inputs.

The neural network may include multiple neurons that are associated with learnable weights and biases. The neurons may be arranged in layers. The neural network may be trained on a training dataset of pairs of documents with known similarity measures.

The neural network may generate an observed output for each training input. During training of the neural network, the parameters of the neural network may be adjusted to optimize the prediction accuracy. Training the neural network may involve processing, by the neural network, pairs of documents, such that the network would determine the similarity measure (i.e., the observed output) for these pairs, and comparing the determined similarity measure with the known similarity measure (i.e., the target output corresponding to the training input as specified by the training data set). The observed output of the neural network may be compared with the target output, and the error may be propagated back to the previous layers of the neural network, whose parameters (e.g., the weights and biases of the neurons) may be adjusted accordingly in order to minimize the loss function (i.e., the difference between the observed output and the training output).

Once trained, the neural network may be used for automatic determination of similarity measure for pairs of documents. The mechanisms described herein to determine the similarity measures may improve the quality of document clusterization process by performing determination of the similarity measure using a trained neural network in a way that takes into account most relevant document attributes.

In some implementations, in order to determine similarity measure for a document 110 and a document cluster, the similarity function is calculated for the document 110 and each document of a subset of one or more of documents from the document cluster. In some implementations, the subset of documents from the document cluster for calculating the similarity measure are selected at random. In some implementations, the similarity measures of the selected documents from the document cluster and the document 110 are averaged to produce the similarity measure of the document cluster and the document 110.

In some implementations, in order to determine similarity measure for a document 110 and a document cluster, the similarity functions is calculated for the document 110 and the centroid of the document cluster.

The centroid of a document cluster is a document having its attributes equal or close to equal to the average values of one or more of the document attributes for one or more of the documents in the cluster.

At block 130 the processing device performing method 100 may determine which of the document clusters has the highest similarity measure as determined at step 120.

At block 140, the processing device performing method 100 may compare the highest similarity measure with a predetermined similarity threshold. If the highest similarity measure is above the threshold, the processing device may assign the document 110 to the cluster that corresponds to the highest similarity measure (150). In some implementations of the present invention, after the document 110 is assigned to a cluster, the processing device performing method 110 recalculates the centroid of this cluster.

If the processing device performing method 110 determines that the highest similarity measure is below the threshold, the processing device may create a new document cluster (160). Then the processing device may assign the document 110 to that new cluster (170).

In some implementations, a user may identify documents that have been erroneously assigned to an inappropriate cluster by the system. In some implementations the user may also identify correct cluster for such document. In such instances the mistake may be recorded by the system and the similarity function may be adjusted to compensate for the mistake.

Figure 5:
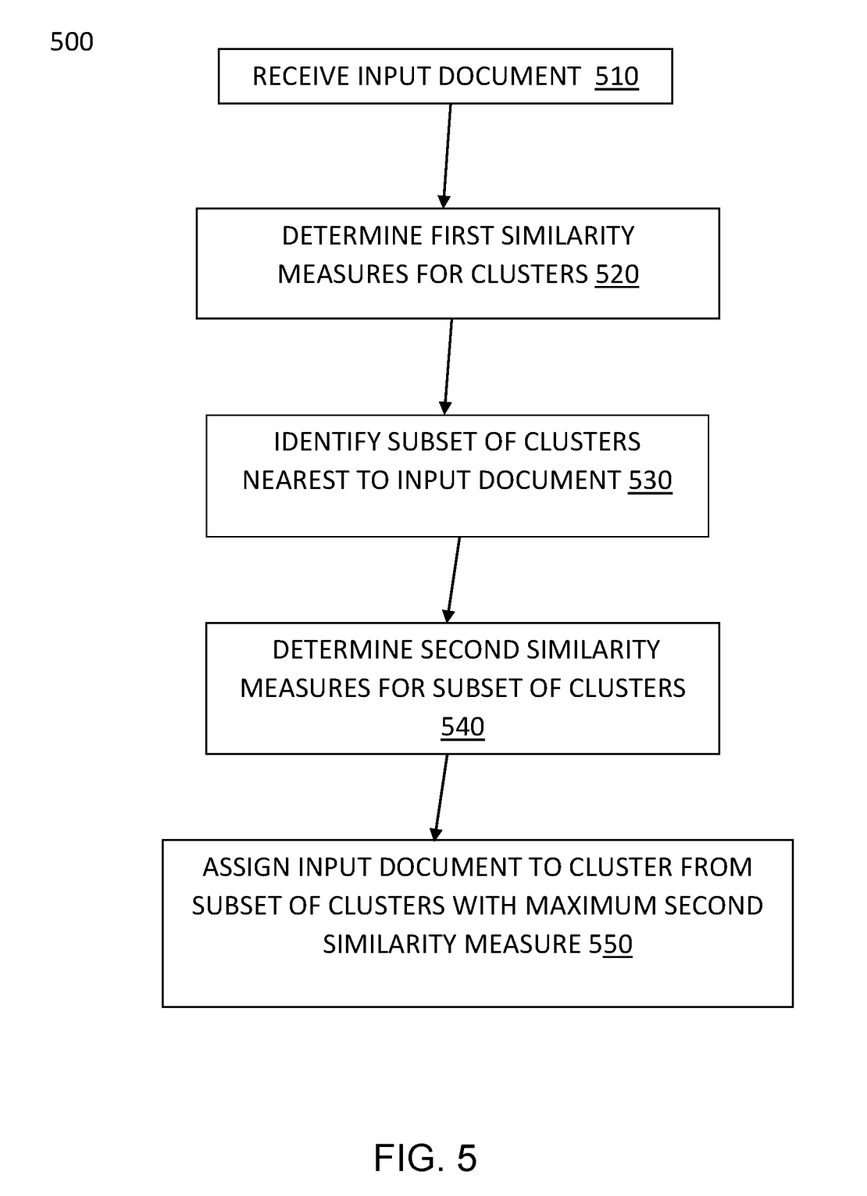
FIG. 5 is a flow diagram illustrating one exemplary method of document clusterization, in accordance with some implementations of the present disclosure.

In some implementations of the present invention, document clusterization method 100 comprises second level differential classification of the clusters, as illustrated in FIG. 5. The processing device performing method 500 analyzes clusters of documents using a first similarity measure to identify a group of adjacent clusters.

Two or more clusters are adjacent to each other if the distance between their centroids is less than a predetermined degree of separation. Such clusters may form a subset of clusters consisting of two or more clusters with substantially close similarity measures.

In some implementations, after a document 510 is received by the processing device performing method 500 (see block 510), the first similarity measure is utilized to identify the nearest subset of clusters to the document 510 (see, blocks 520, 530). Then, as shown in block 540, a second, more sensitive, similarity functions is used to determine a second set of similarity measures for the clusters from the subset of clusters, identified in block 530. At block 550, based on the second similarity measures, the processing device determines a document cluster closest to the input document 510 and assigns the document 510 to this cluster.

Figure 6:
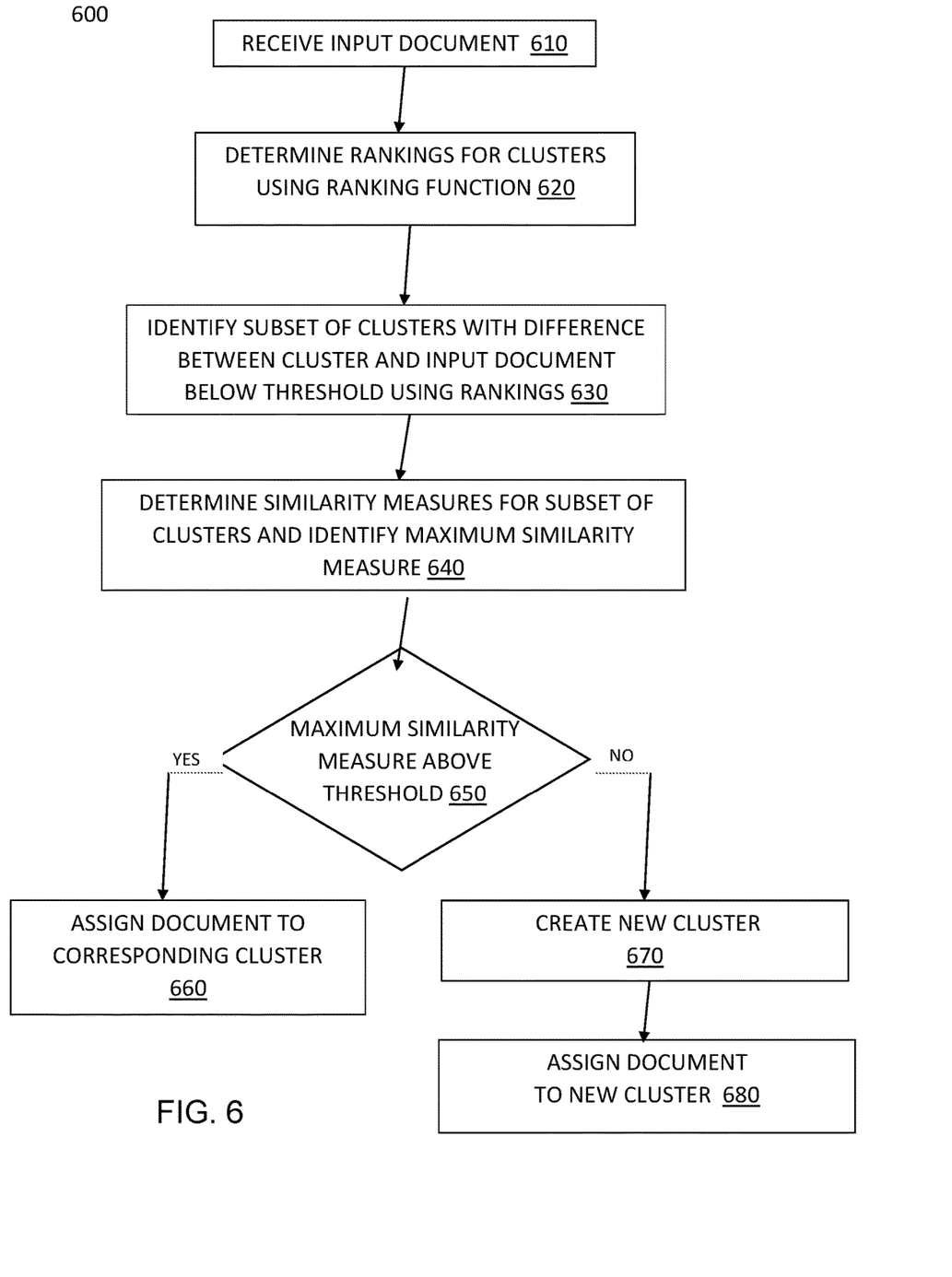
FIG. 6 is a flow diagram illustrating one exemplary method of document clusterization, in accordance with some implementations of the present disclosure.

In some implementations of the present invention, as illustrated in FIG. 6, a ranking function based on similarity measure is used to identify the most promising clusters for the document 110. The ranking function calculates probability of the document 110 being significantly similar to a given document cluster.

As illustrated in FIG. 6, at block 610 the processing device receives an input document 610. Then the ranking function is applied to the document clusters to calculate probability of the document 610 belonging to the particular cluster 620. At block 630, a subset of document clusters with high probability of similarity to the document 110 may be identified. In some implementations, this subset includes at least a predetermined number of document clusters with highest probabilities of similarity. In some implementations, the subset includes all document clusters with the probability of similarity to the document 610 exceeding a predetermined probability threshold. At block 640, for the document clusters from the subset of document clusters the processing device calculates more accurate (and more resource-consuming) similarity measures (e.g., similarity measures that operate on a larger number of document attributes). From these similarity measures the highest similarity measure is identified. At block 650, the processing device performing method 600 may compare the highest similarity measure with a predetermined similarity threshold. If the highest similarity measure is above the threshold, the processing device may assign the document 610 to the cluster that corresponds to the highest similarity measure (660). If the processing device performing method 600 determines that the highest similarity measure is below the threshold, the processing device may create a new document cluster (670). Then the processing device may assign the document 610 to that new cluster (680).

In some implementations of the present invention, the processing device may perform a step of cluster minimization. The clusters created by method 100 and previously created clusters are analyzed to identify attributes satisfying one or more cluster merging criteria. Two or more clusters having documents with attributes corresponding to these criteria may be merged to form bigger clusters. In some implementations, the processing device may recalculate centroids of the resulting clusters.

The above-described method may be utilized for various use cases. In an illustrative example, the method may be utilized for grouping documents by parties referenced in the document. Input stream of documents may include such documents as applications, invoices, bills of landing, purchase orders, etc. Most of these documents originate from an organization and include name and address of this organization. The exact list of these organizations may not exist. Also, documents from new organizations may be added to the input stream at any time.

The method of the present invention allows grouping of these documents by the organization. In other implementation, the present method may allow grouping of such documents by geographical locations, referenced in these documents (from the same organization or different organizations). In another implementation, the documents may be grouped by their format (e.g., all invoices grouped together, separately from purchase orders, receipts, bills of landing, etc.). In another implementations, the documents may be grouped by specific items (e.g., goods or types of goods) references in these documents. These examples are illustrative and do not limit the present invention in any form.

Figure 3:
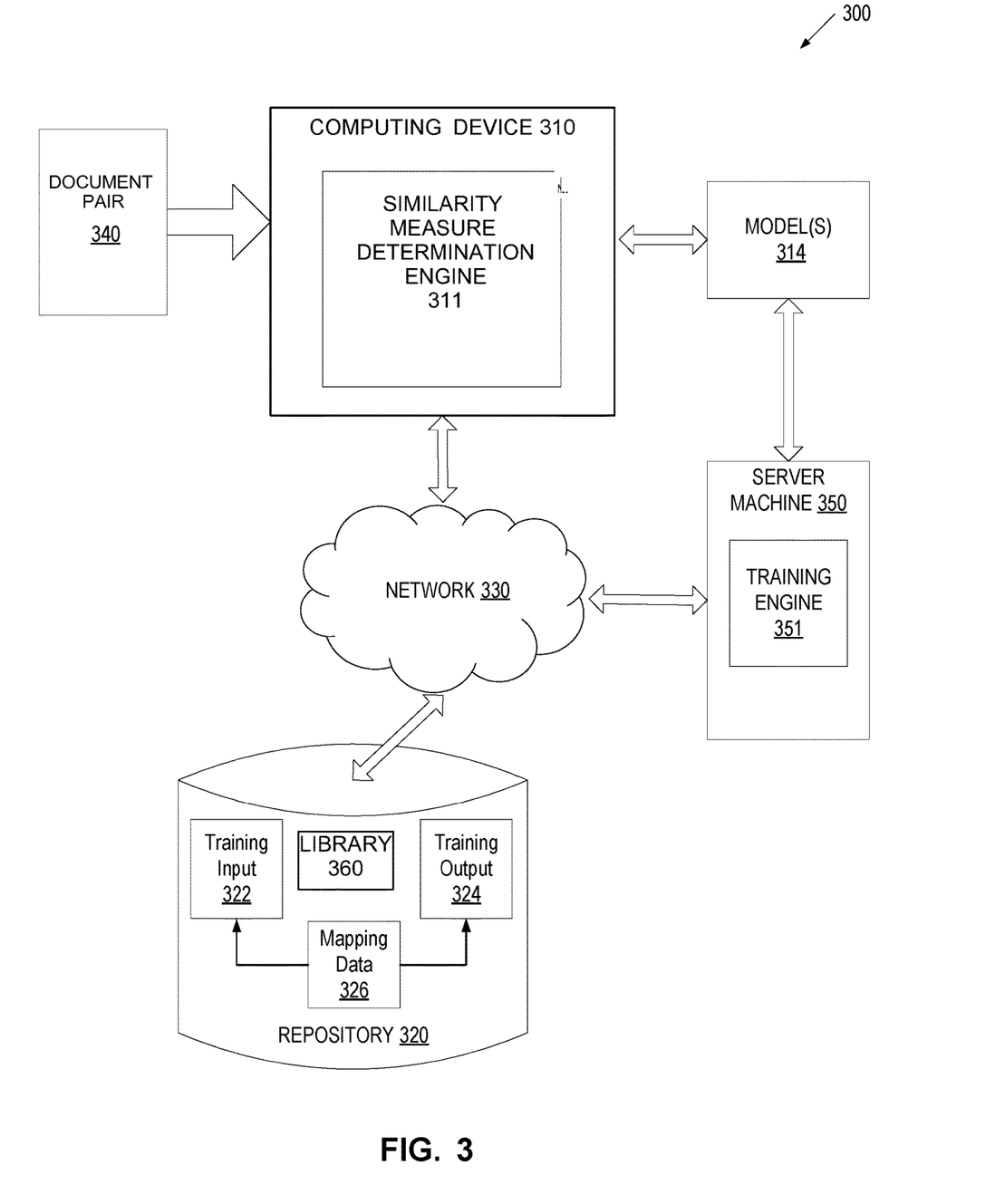
FIG. 3 is a block diagram of an example computer system in which implementations of the disclosure may operate.

FIG. 3 is a block diagram of an example computer system 300 in which implementations of the disclosure may operate. As illustrated, system 300 can include a computing device 310, a repository 320, and a server machine 350 connected to a network 330. Network 330 may be a public network (e.g., the Internet), a private network (e.g., a local area network (LAN) or wide area network (WAN)), or a combination thereof.

The computing device 310 may be a desktop computer, a laptop computer, a smartphone, a tablet computer, a server, a scanner, or any suitable computing device capable of performing the techniques described herein. In some implementations, the computing device 210 can be (and/or include) one or more computing devices 400 of FIG. 4.

A document pair 340 may be received by the computing device 310. The document pair 340 may be received in any suitable manner. Additionally, in instances where the computing device 310 is a server, a client device connected to the server via the network 330 may upload a document pair 340 to the server. In instances where the computing device 310 is a client device connected to a server via the network 330, the client device may download the document pair 340 from the server or from the repository 320.

The document pair 340 may be used to train a set of machine learning models or may be a new document pair for which similarity measure determination is desired.

In one implementation, computing device 310 may include a similarity measure determination engine 311. The similarity measure determination engine 311 may include instructions stored on one or more tangible, machine-readable storage media of the computing device 310 and executable by one or more processing devices of the computing device 310.

In one implementation, the similarity measure determination engine 311 may use a set of trained machine learning models 314 to determine one or more similarity measures of document pairs 360. The library of document pairs may be stored in a repository 320. The machine learning models 314 are trained and used to determine similarity measures.

The similarity measure determination engine 311 may be a client-based application or may be a combination of a client component and a server component. In some implementations, the similarity measure determination engine 311 may execute entirely on the client computing device such as a server computer, a desktop computer, a tablet computer, a smart phone, a notebook computer, a camera, a video camera, or the like. Alternatively, a client component of similarity measure determination engine 311 executing on a client computing device may receive a document pair and transmit it to a server component of the similarity measure determination engine 311 executing on a server device that performs the determination of similarity measure. The server component of the similarity measure determination engine 311 may then return a determined similarity measure to the client component of the similarity measure determination engine 311 executing on the client computing device for storage. Alternatively, the server component of the similarity measure determination engine 311 may provide an identification result to another application. In other implementations, similarity measure determination engine 311 may execute on a server device as an Internet-enabled application accessible via a browser interface. The server device may be represented by one or more computer systems such as one or more server machines, workstations, mainframe machines, personal computers (PCs), etc.

Server machine 350 may be and/or include a rackmount server, a router computer, a personal computer, a portable digital assistant, a mobile phone, a laptop computer, a tablet computer, a camera, a video camera, a netbook, a desktop computer, a media center, or any combination of the above. The server machine 350 may include a training engine 351. The training engine 351 can construct the machine learning model(s) 314 for similarity measure determination. The machine learning model(s) 314, as illustrated in FIG. 3, may be trained by the training engine 351 using training data that includes training inputs and corresponding training outputs (correct answers for respective training inputs). The training engine 351 may find patterns in the training data that map the training input to the training output (the answer to be predicted) and provide the machine learning models 314 that capture these patterns. The set of machine learning models 314 may be composed of, e.g., a single level of linear or non-linear operations (e.g., a support vector machine (SVM)) or may be a deep neural network, e.g., a machine learning model that is composed of multiple levels of non-linear operations. Examples of deep neural networks are neural networks including convolutional neural networks, recurrent neural networks (RNN) with one or more hidden layers, and fully connected neural networks. In some implementations, the machine learning models 314 may include one or more neural networks as described in connection with FIG. 2.

The machine learning models 314 may be trained to determine similarity measures for the document pair 340. The training data may be stored in the repository 320 and may include one or more training inputs 322 and one or more training outputs 324. The training data may also include mapping data 326 that maps the training inputs 322 to the training outputs 324. During the training, the training engine 351 can find patterns in the training data 326 that can be used to map the training inputs to the training outputs. The patterns can be subsequently used by the machine learning model(s) 314 for future predictions. For example, upon receiving an input of unknown document pair, the trained machine learning model(s) 314 may predict a similarity measure for this document pair and may provide such similarity measure as an output.

The repository 320 may be a persistent storage capable of storing structures to perform similarity measure determination in accordance with implementations of the present disclosure. The repository 320 may be hosted by one or more storage devices, such as main memory, magnetic or optical storage-based disks, tapes or hard drives, NAS, SAN, and so forth. Although depicted as separate from the computing device 310, in an implementation, the repository 320 may be part of the computing device 310. In some implementations, repository 320 may be a network-attached file server, while in other implementations content repository 320 may be some other type of persistent storage such as an object-oriented database, a relational database, and so forth, that may be hosted by a server machine or one or more different machines coupled to the via the network 330.

Figure 4:
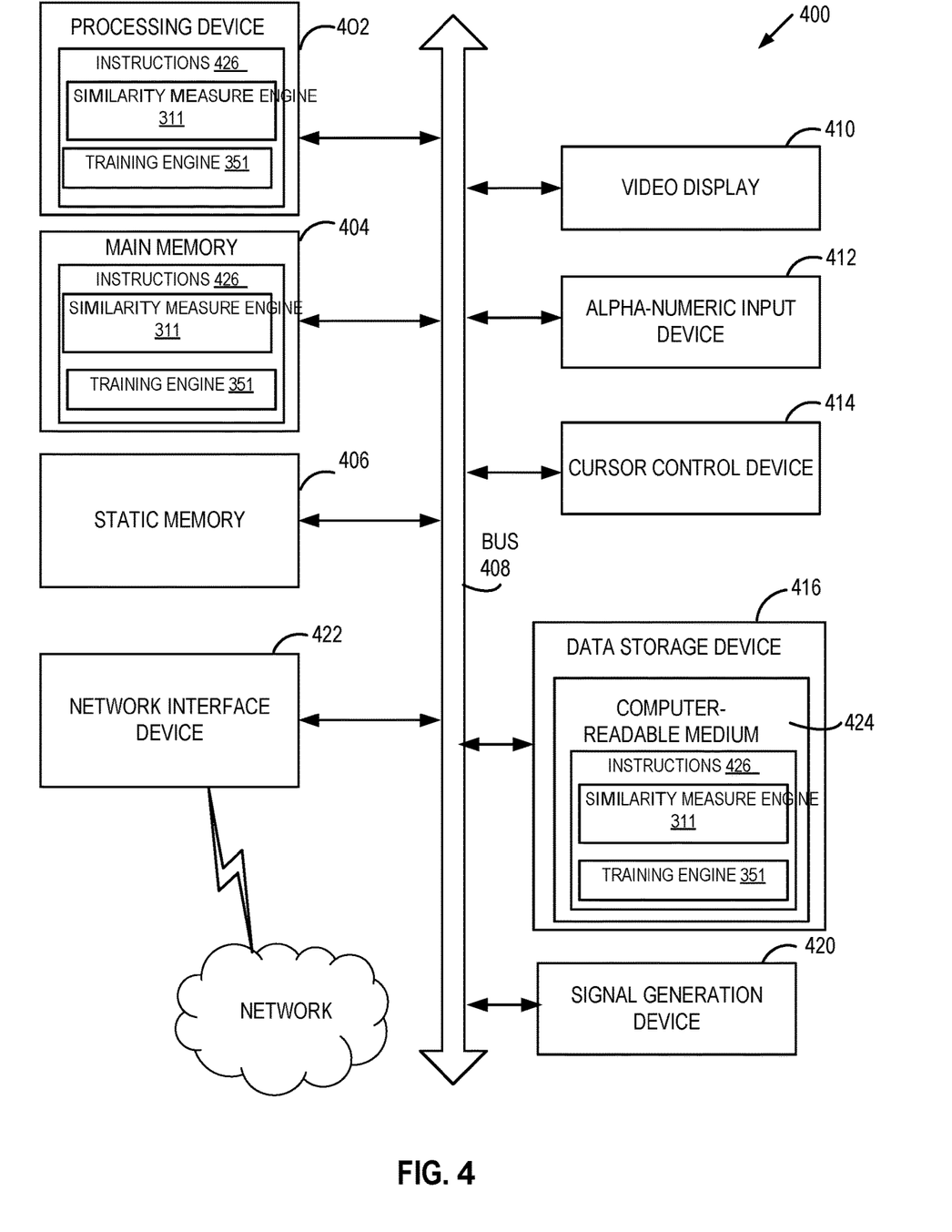
FIG. 4 illustrates a block diagram of a computer system in accordance with some implementations of the present disclosure.

FIG. 4 depicts an example computer system 400 which can perform any one or more of the methods described herein. The computer system may be connected (e.g., networked) to other computer systems in a LAN, an intranet, an extranet, or the Internet. The computer system may operate in the capacity of a server in a client-server network environment. The computer system may be a personal computer (PC), a tablet computer, a set-top box (STB), a Personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 400 includes a processing device 402, a main memory 404 (e.g., read-only memory (ROM), flash memory, dynamic random access memory (DRAM) such as synchronous DRAM (SDRAM)), a static memory 406 (e.g., flash memory, static random access memory (SRAM)), and a data storage device 416, which communicate with each other via a bus 408.

Processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 402 may also be one or more special-purpose processing devices such as an application specific integrated circuit (ASIC), a field programmable gate array (FPGA), a digital signal processor (DSP), network processor, or the like. The processing device 402 is configured to execute instructions 426 for implementing the similarity measure detection engine 311 and/or the training engine 351 of FIG. 3 and to perform the operations and steps discussed herein (e.g., method 100 of FIG. 1).

The computer system 400 may further include a network interface device 422. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker). In one illustrative example, the video display unit 410, the alphanumeric input device 412, and the cursor control device 414 may be combined into a single component or device (e.g., an LCD touch screen).

The data storage device 416 may include a computer-readable storage medium 424 on which is stored the instructions 426 embodying any one or more of the methodologies or functions described herein. The instructions 426 may also reside, completely or at least partially, within the main memory 404 and/or within the processing device 402 during execution thereof by the computer system 400, the main memory 404 and the processing device 402 also constituting computer-readable media. In some implementations, the instructions 426 may further be transmitted or received over a network via the network interface device 422.

While the computer-readable storage medium 424 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "analyzing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Furthermore, the terms "first," "second," "third," "fourth," etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A computer-implemented method for document clusterization, comprising:
   receiving an input document;
   determining, by evaluating a first document similarity function, a first plurality of similarity measures, wherein each similarity measure of the first plurality of similarity measures reflects a degree of similarity between the input document and a corresponding cluster of documents of a plurality of clusters of documents, wherein a first likelihood of the first document similarity function to yield a false negative result exceeds a second likelihood of the first document similarity function to yield a false positive result;
   based on the plurality of similarity measures, determining that the input document belongs to a subset comprising two or more adjacent clusters of the plurality of clusters of documents, wherein a distance between centroids of the two or more adjacent clusters is less than a predefined separation distance;
   determining, by evaluating a second document similarity function that is different from the first document similarity function, a second plurality of similarity measures, wherein each similarity measure of the second plurality of similarity measures reflects a degree of similarity between the input document and a corresponding cluster of documents of the subset of the plurality of clusters of documents, and wherein the first document similarity function is based on a first number of attributes of the input document, the second document similarity function is based on a second number of attributes of the input document, the second number exceeding the first number;
   associating the input document with a cluster of documents associated with a maximum similarity measure of the second plurality of similarity measures.

2. The method of claim 1, wherein the first document similarity function is based on one or more attributes of the input document, the one or more attributes comprising at least one of: a grid type attribute, a singular value decomposition (SVD) type attribute, or an image type attribute.

3. The method of claim 1, wherein the first document similarity function is implemented by a neural network.

4. The method of claim 1, wherein the input document is a text document.

5. The method of claim 1, further comprising: responsive to determining that a first cluster of documents of the plurality of clusters of documents is associated with a first document having a first value of a document feature and a second cluster of documents of the plurality of clusters of documents is associated with a second document having the first value of the document feature, merging the first cluster of documents and the second cluster of documents.

6. The method of claim 1, further comprising: responsive to determining that the maximum similarity measure falls below a similarity measure threshold, creating a new cluster of documents; and associating the input document with the new cluster of documents.

7. The method of claim 1, wherein the first similarity function is based on a set of attributes, each attribute of the set of attributes computed for a corresponding cell of a grid defined on the input document.

8. The method of claim 1, wherein each similarity measure of the second plurality of similarity measures reflects a degree of similarity between the input document and one or more randomly selected documents of a corresponding cluster of documents of the subset of the plurality of clusters of documents.

9. A system, comprising:
a memory;
a processor, coupled to the memory, the processor configured to:
receive an input document;
determine, by evaluating a first document similarity function, a first plurality of similarity measures, wherein each similarity measure of the first plurality of similarity measures reflects a degree of similarity between the input document and a corresponding cluster of documents of a plurality of clusters of documents, wherein a first likelihood of the first document similarity function to yield a false negative result exceeds a second likelihood of the first document similarity function to yield a false positive result;
based on the plurality of similarity measures, determine that the input document belongs to a subset comprising two or more adjacent clusters of the plurality of clusters of documents, wherein a distance between centroids of the two or more adjacent clusters is less than a predefined separation distance;
determine, by evaluating a second document similarity function that is different from the first document similarity function, a second plurality of similarity measures, wherein each similarity measure of the second plurality of similarity measures reflects a degree of similarity between the input document and a corresponding cluster of documents of the subset of the plurality of clusters of documents, and wherein the first document similarity function is based on a first number of attributes of the input document, the second document similarity function is based on a second number of attributes of the input document, the second number exceeding the first number; and
associate the input document with a cluster of documents associated with a maximum similarity measure of the second plurality of similarity measures.

10. The system of claim 9, wherein the first document similarity function is based on one or more attributes of the input document, the one or more attributes comprising at least one of: a grid type attribute, a singular value decomposition (SVD) type attribute, or an image type attribute.

11. The system of claim 9, wherein the first document similarity function is implemented by a neural network.

12. The system of claim 9, wherein the input document is a text document.

13. The system of claim 9, wherein the processor is further configured to:
responsive to determining that a first cluster of documents of the plurality of clusters of documents is associated with a first document having a first value of a document feature and a second cluster of documents of the plurality of clusters of documents is associated with a second document having the first value of the document feature, merge the first cluster of documents and the second cluster of documents.

14. The system of claim 9, wherein the processor is further configured to:
responsive to determining that the maximum similarity measure falls below a similarity measure threshold, create a new cluster of documents; and
associate the input document with the new cluster of documents.

15. A non-transitory computer-readable storage medium comprising executable instructions that, when executed by a computer system, cause the computer system to:
receive an input document;
determine, by evaluating a first document similarity function, a first plurality of similarity measures, wherein each similarity measure of the first plurality of similarity measures reflects a degree of similarity between the input document and a corresponding cluster of documents of a plurality of clusters of documents, wherein a first likelihood of the first document similarity function to yield a false negative result exceeds a second likelihood of the first document similarity function to yield a false positive result;
based on the plurality of similarity measures, determine that the input document belongs to a subset comprising two or more adjacent clusters of the plurality of clusters of documents, wherein a distance between centroids of the two or more adjacent clusters is less than a predefined separation distance;
determine, by evaluating a second document similarity function that is different from the first document similarity function, a second plurality of similarity measures, wherein each similarity measure of the second plurality of similarity measures reflects a degree of similarity between the input document and a corresponding cluster of documents of the subset of the plurality of clusters of documents, and wherein the first document similarity function is based on a first number of attributes of the input document, the second document similarity function is based on a second number of attributes of the input document, the second number exceeding the first number; and
associate the input document with a cluster of documents associated with a maximum similarity measure of the second plurality of similarity measures.

16. The non-transitory computer-readable storage medium of claim 15, wherein the first document similarity function is based on one or more attributes of the input document, the one or more attributes comprising at least one of: a grid type attribute, a singular value decomposition (SVD) type attribute, or an image type attribute.

17. The non-transitory computer-readable storage medium of claim 15, wherein the first document similarity function is implemented by a neural network.

18. The non-transitory computer-readable storage medium of claim 15, wherein the input document is a text document.

19. The non-transitory computer-readable storage medium of claim 15, further comprising executable instructions that, when executed by the computer system, cause the computer system to:
- responsive to determining that a first cluster of documents of the plurality of clusters of documents is associated with a first document having a first value of a document feature and a second cluster of documents of the plurality of clusters of documents is associated with a second document having the first value of the document feature, merge the first cluster of documents and the second cluster of documents.

20. The non-transitory computer-readable storage medium of claim 15, further comprising executable instructions that, when executed by the computer system, cause the computer system to:
- responsive to determining that the maximum similarity measure falls below a similarity measure threshold, create a new cluster of documents; and
- associate the input document with the new cluster of documents.

* * * * *